United States Patent
Pacovský et al.

(10) Patent No.: US 8,903,752 B1
(45) Date of Patent: Dec. 2, 2014

(54) CLASSIFYING DOCUMENTS BASED ON AUTOMATICALLY DETECTED RULES

(75) Inventors: Ondřej Pacovský, Oberrieden (CH); Douglas Alexander Aberdeen, Zurich (CH); Pál Takácsi, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 13/370,264

(22) Filed: Feb. 9, 2012

(51) Int. Cl.
*G06N 5/00* (2006.01)
*G06F 1/00* (2006.01)

(52) U.S. Cl.
USPC ............................ 706/20; 715/234; 709/202

(58) Field of Classification Search
USPC .......................................................... 706/20
See application file for complete search history.

(56) References Cited

U.S. PATENT DOCUMENTS

| | | | |
|---|---|---|---|
| 6,728,752 B1 * | 4/2004 | Chen et al. ..................... | 709/203 |
| 7,219,302 B1 * | 5/2007 | O'Shaughnessy et al. ... | 715/752 |
| 2004/0030741 A1 * | 2/2004 | Wolton et al. ................. | 709/202 |
| 2011/0047168 A1 * | 2/2011 | Ellingsworth ................ | 707/749 |

* cited by examiner

*Primary Examiner* — Jeffrey Gaffin
*Assistant Examiner* — Kalpana Bharadwaj
(74) *Attorney, Agent, or Firm* — McDermott Will & Emery LLP (57) ABSTRACT

Systems and methods for classifying a set of documents are provided. In some aspects, a method includes receiving a subset of the set of documents. The method also includes automatically determining at least one classification rule for the subset of documents based on the documents in the subset. At least a true-positive threshold proportion of documents in the subset of documents follows the at least one classification rule. At most a false-positive threshold proportion of documents in the set of documents and not in the subset of documents follow the at least one classification rule. The method also includes storing the at least one classification rule in association with the subset of documents.

22 Claims, 5 Drawing Sheets

CLASSIFYING DOCUMENTS BASED ON AUTOMATICALLY DETECTED RULES

FIELD

The subject technology generally relates to document management in a computer system and, in particular, relates to classifying documents based on automatically detected rules.

BACKGROUND

Users of document management or electronic messaging services may receive many different documents or messages related to many different topics every day. To arrange their documents or messages and to be able to easily locate interesting or important documents or messages, users oftentimes apply labels to their documents or messages or place the documents or messages into folders. For example, in an electronic messaging service, a user may assign messages from members of his/her family the label "family," and messages concerning taxes, mortgages, or retirement the label "finance." One drawback of this labeling scheme is that users spend a lot of time reviewing their messages and determining that a particular message needs to be associated with a particular label or folder. Occasionally, users may forget to assign a label to a message, making locating and retrieving the message at a later time more difficult. As the foregoing illustrates, a technique for automatically classifying documents or messages by label or folder may be desirable.

SUMMARY

The disclosed subject matter relates to a computer-implemented method for classifying a set of documents. The method includes receiving a subset of the set of documents. The method also includes automatically determining at least one classification rule for the subset of documents based on the documents in the subset. At least a true-positive threshold proportion of documents in the subset of documents follows the at least one classification rule. At most a false-positive threshold proportion of documents in the set of documents and not in the subset of documents follow the at least one classification rule. The method also includes storing the at least one classification rule in association with the subset of documents.

The disclosed subject matter further relates to a non-transitory computer-readable medium. The computer-readable medium includes instructions that, when executed by a computer, cause the computer to implement a method for classifying a set of documents. The instructions include code for receiving a plurality of subsets of the set of documents. The instructions also include code for automatically determining at least one classification rule corresponding to each subset in at least a portion of the plurality of subsets of documents. At least one document in each subset in the at least a portion of the plurality of subsets follows the at least one corresponding classification rule. The instructions also include code for storing the at least one corresponding classification rule in association with each subset of documents in the at least the portion of the plurality of subsets of documents.

The disclosed subject matter further relates to a system. The system includes one or more processors. The system also includes a memory that includes instructions that, when executed by the one or more processors, cause the one or more processors to implement a method for classifying a set of electronic messages. The instructions include code for receiving a subset of the set of electronic messages. The instructions also include code for automatically determining at least one classification rule for the subset of electronic messages based on the electronic messages in the subset. At least a true-positive threshold proportion of electronic messages in the subset of electronic messages follows the at least one classification rule. At most a false-positive threshold proportion of electronic messages in the set of electronic messages and not in the subset of electronic messages follow the at least one classification rule. The instructions also include code for storing the at least one classification rule in association with the subset of electronic messages.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to classifying documents based on automatically detected rules. In one implementation, a computer may receive a set of documents, e.g., a set of electronic messages associated with an electronic messaging account, e.g., an email account or a mobile phone short messaging service (SMS) account, and a subset of the set of documents, e.g., electronic messages in the electronic messaging account that are associated with a label or a folder. The computer may automatically determining at least one classification rule corresponding to the subset of documents based on the documents in the subset. At least a true-positive threshold proportion (e.g., 90%) of documents in the subset of documents may follow the at least one classification rule. At most a false-positive threshold proportion (e.g., 1%) of documents in the set of documents and not in the subset of documents may follow the at least one classification rule. The at least one classification rule may correspond to a Boolean expression, e.g., "Sender has an electronic messaging address in the @ABC-Corporation.com domain," or "Message includes the string 'tax' in the subject or Accountant@Accounting-Firm.com is a sender or recipient of Message." The computer may store the at least one classification rule in association with the subset of documents. When additional documents are received, e.g., additional electronic messages are sent from or received in the electronic messaging account, the additional documents may be assigned to the subset if the additional documents follow the at least one classification rule corresponding to the subset.

Figure 1:
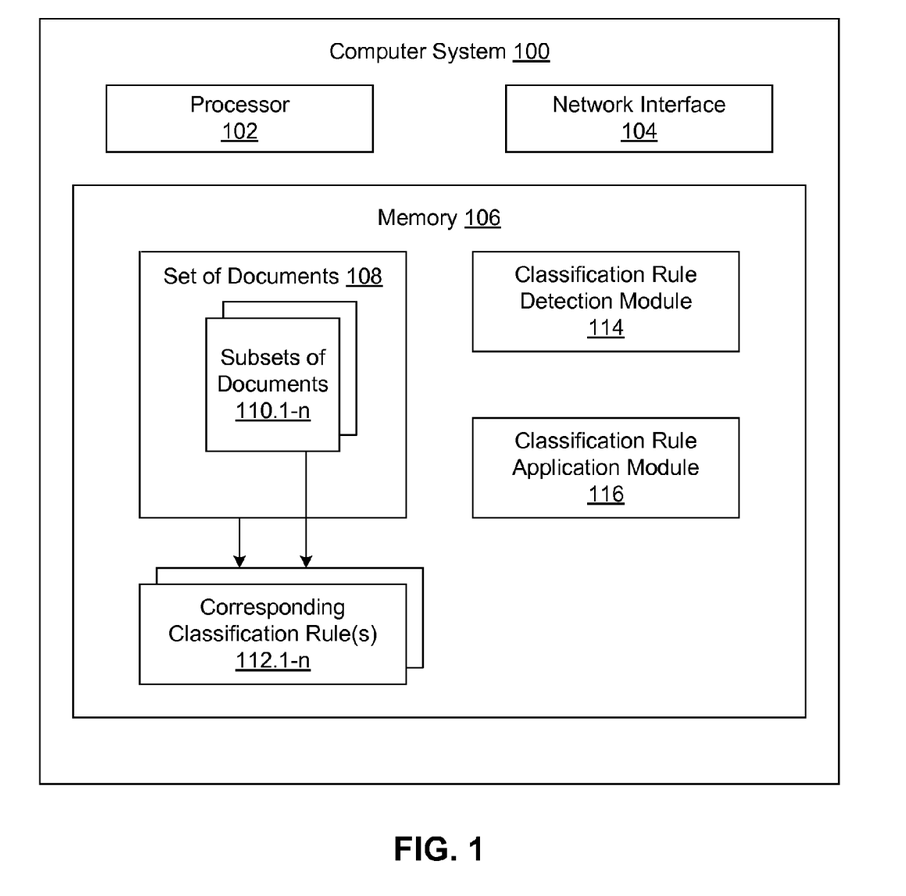
FIG. 1 illustrates an example of a computer system configured to implement classifying documents based on automatically detected rules.

FIG. 1 illustrates an example of a computer system 100 configured to implement classifying documents based on automatically detected rules.

The computer system 100 may be a client computing device running an electronic messaging program (e.g., an email program or a mobile phone short messaging service (SMS) program) or another document management program or a server machine storing electronic messages or other documents, e.g., a mail server. As shown, the computer 100 includes a processor 102, a network interface 104, and a memory 106. The processor 108 is configured to execute computer instructions that are stored in a computer-readable medium, such as the memory 106. For example, the processor 102 may be a central processing unit (CPU). The network interface 104 is configured to allow the computer system 100 to transmit and receive data in a network, e.g., the Internet or a cellular network. The network interface 104 may include one or more network interface cards (NICs). The memory 106 stores data and instructions. As illustrated, the memory 112 stores a set of documents 108 that includes one or more subsets of documents 110.1-$n$, corresponding classification rules 112.1-$n$, a classification rule detection module 114, and a classification rule application module 116.

The set of documents 108 may include any set of documents. For example, the set of documents 108 may include electronic messages in an electronic messaging account or files in a directory. A subset of documents 110.1-$n$ may be any subset of the set of documents. In one implementation, the subsets of documents may be mutually exclusive. For example, a document in the directory "/Fred" may be placed either in the subdirectory "/Fred/mortgage" or the subdirectory "/Fred/college," but not both. Alternatively, the subsets of documents may not be mutually exclusive. For example, an electronic message may be assigned the label "mortgage," the label "college," neither label, or both labels.

If the set of documents 108 corresponds to electronic messages in an electronic messaging account, a subset 110.1-$n$ may be associated with a category. The category may be a folder, a label, or a mark (e.g., a flag, a star, or an important mark). Alternatively, the category may correspond to an action applied to the electronic messages in the electronic messaging account that are associated with the category. Example actions include one or more of marking the electronic messages as read (before the owner of the account reads the messages), foregoing placing the electronic messages in the inbox, sending an automatic reply message, flagging the electronic messages, or marking the electronic messages as important. If the set of documents 108 corresponds to files in a directory, the subset of documents 110.1-$n$ may correspond to files in a subdirectory of the directory.

The subject technology may be implemented with only one subset of documents 110.1-$n$ or with multiple subsets of documents 110.1-$n$. Each of at least a portion of the subsets of documents 110.1-$n$ may be associated with at least one corresponding classification rule 112.1-$n$. The at least one corresponding classification rule 112.1-$n$ may be represented as at least one Boolean expression. Example Boolean expressions include: "Sender has an electronic messaging address in the @ABC-Corporation.com domain," "File has a filetype of .txt and file contains the string 'rabbit'," or "Message includes the string 'tax' in the subject or Accountant@Accounting-Firm.com is a sender or recipient of Message." Each of these Boolean expressions may be either TRUE or FALSE for any particular document in the set of documents 108. If the set of documents is a set of electronic messages, e.g., email messages, the classification rule may correspond to one or more of: a sender of the document being a member of a set of sender, a recipient of the document being a member of a set of recipients, a keyword being present in the subject of the document, or a keyword being present within the document. If the set of documents is a set of files in a directory, the at least one classification rule may include the document having one of one or more file types, a keyword being present in the filename of the document, or a keyword being present within the document. In one implementation, a user of a document storage service or electronic messaging service may opt out of having the document storage service or electronic messaging service analyze the text or metadata of the documents or messages, e.g., for the purpose of classifying the documents or messages.

The memory 106 of the computer system 100 may also include a classification rule detection module 114. The classification rule detection module 114 may be configured to automatically determine at least one classification rule (e.g., classification rule 112.1) corresponding to a subset of documents (e.g., subset of documents 110.1). At least one document in the subset of documents may follow the at least one corresponding classification rule. In one example, at least a true-positive threshold proportion (e.g., 90%) of the documents in the subset of documents may follow the at least one corresponding classification rule. At most a false-positive threshold proportion (e.g., 1%) of the documents in the set of documents 108 and not in the subset may follow the at least one corresponding classification rule. The at least one classification rule may be stored in association with the subset of documents.

As shown, the memory 106 of the computer system 100 also includes a classification rule application module 116. The classification rule application module 116 may be configured to receive a target document (e.g., a new electronic message that was recently received in the electronic messaging account) in the set of documents 108 and automatically determine, based on at least one classification rule 112.1-$n$, whether the target document may be placed into one or more of the subsets of documents 110.1-$n$. If the target document can be placed into one or more of the subsets of documents 110.1-$n$, the classification rule application module 116 may place the document into the one or more subsets 110.1-$n$. If the target document cannot be placed into one or more subsets of documents 110.1-$n$, the classification rule application module 116 may forego placing the target document into a subset 110.1-*n*, while allowing the target document to remain in the set of documents 110.

Figure 2:
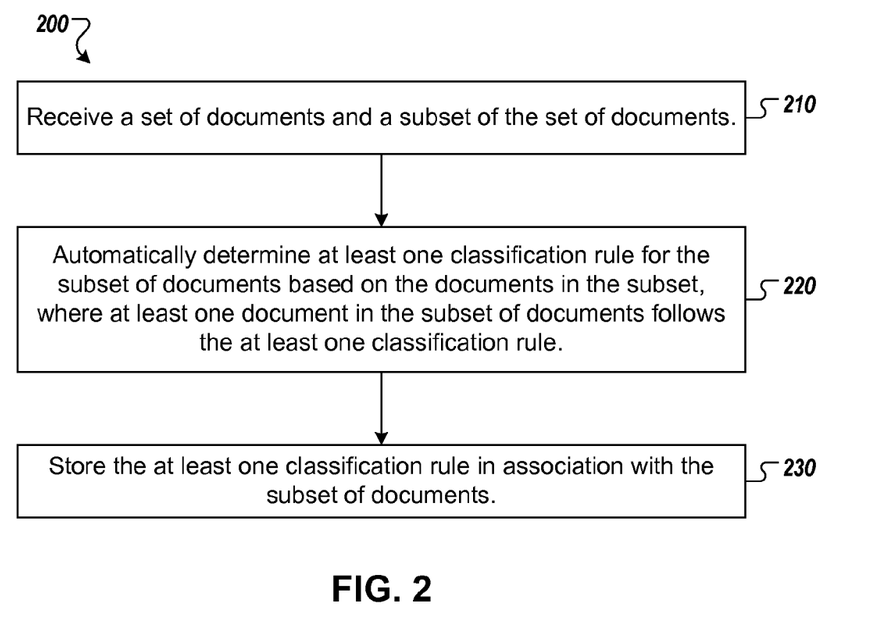
FIG. 2 illustrates an example process by which documents may be classified based on automatically detected rules.

FIG. 2 illustrates an example process 200 by which documents may be classified based on automatically detected rules.

The process 200 begins at step 210, where a computer receives a set of documents and a subset of the set of documents. The set of documents may be a set of electronic messages associated with an electronic messaging account, and the subset may be electronic messages in the electronic messaging account that have a label or a mark or are placed in a folder. The subset of documents may be associated with an action applied to documents in the subset. Example actions may include marking the documents as read, foregoing placing the documents in the inbox, or sending an automatic reply message to the documents. Alternatively, the set of documents may include files in a directory, and the subset of documents may include files in a subdirectory of the directory.

In one example, the computer may receive a plurality of subsets of documents, rather than a single subset. The plurality of subsets may be mutually exclusive, such that no single document belongs to more than one subset. Alternatively, the plurality of subsets may not be mutually exclusive, and a particular single document may belong to two or more subsets. The plurality of subsets may include two subsets, three subsets, four subsets, five subsets, or more than five subsets.

In step 220, the computer automatically determines at least one classification rule for the subset of documents based on the documents in the subset. At least one document in the subset of documents may follow the at least one classification rule. In one implementation, at least a true-positive threshold proportion of documents in the subset of documents follows the at least one classification rule or at most a false-positive threshold proportion of documents in the set of documents and not in the subset of documents follows the at least one classification rule. The at least one classification rule corresponding to the subset may be based on one or more of: a sender of one or more documents in the subset, a recipient of one or more documents in the subset, a subject of one or more documents in the subset, a filename of one or more documents in the subset, a file type of one or more documents in the subset, or text within one or more documents in the subset.

The at least one classification rule may include at least one Boolean expression. A Boolean expression may be an expression that can be evaluated as being TRUE or FALSE. Example Boolean expressions include: "Sender has an electronic messaging address in the @ABC-Corporation.com domain," "File has a filetype of .txt and file contains the string 'rabbit'," or "Message includes the string 'tax' in the subject or Accountant@Accounting-Firm.com is a sender or recipient of Message." Each of these Boolean expressions may be either TRUE or FALSE for any particular document in the set of documents. If the set of documents includes a set of electronic messages, the at least one classification rule may include one or more of: a sender of the document being a member of a set of senders, a recipient of the document being a member of a set of recipients, a keyword being present in a subject of the document, or a keyword being present within the document. If the set of documents includes files in a directory, the at least one classification rule may include one or more of: the document having one of one or more file types, a keyword being present in the filename of the document, or a keyword being present within the document.

In one example, the at least one classification rule for the subset of documents may be determined based on an action by the user. For example, the user may place a document (e.g., an electronic message or an email message) in a folder, add a label to a document, or add a mark to a document. For example, a user of an electronic messaging account marks multiple messages received from the @LawFirm.com domain with the label "legal." Based on this action by the user, a classification rule that if a message is received from the @LawFirm.com domain, then the message may be assigned the label "legal" may be determined. In another example, a user may flag multiple text messages received from the telephone number 650-555-1212. Based on this action by the user, a classification rule that if a text message is received from the telephone number 650-555-1212, then the text message may be flagged may be determined.

If there are a plurality of subsets of documents, the computer may automatically determine at least one classification rule corresponding to each subset in at least a portion of the plurality of subsets of documents. The at least the portion of the plurality of subsets may include one subset, two subsets, three subsets, four subsets, five subsets, or more than five subsets. The at least the portion of the plurality of subsets may include some or all of the plurality of subsets. At least one document in each subset in the at least the portion of the plurality of subsets may follow the at least one classification rule. In addition, at least a true-positive threshold proportion of the documents in a first subset of documents in the at least a portion of the plurality of subsets of documents may follow the at least one corresponding classification rule, or at most a false-positive threshold proportion of the documents in the set of documents and not in the first subset of documents in the at least a portion of the plurality of subsets of documents may follow the at least one classification rule.

In step 230, the computer stores the at least one classification rule in association with the subset of documents. If there are a plurality of subsets of documents, the computer may store the at least one corresponding classification rule in association with each subset of documents in the at least the portion of the plurality of subsets of documents that have corresponding classification rules. After step 230, the process 200 ends.

Figure 3:
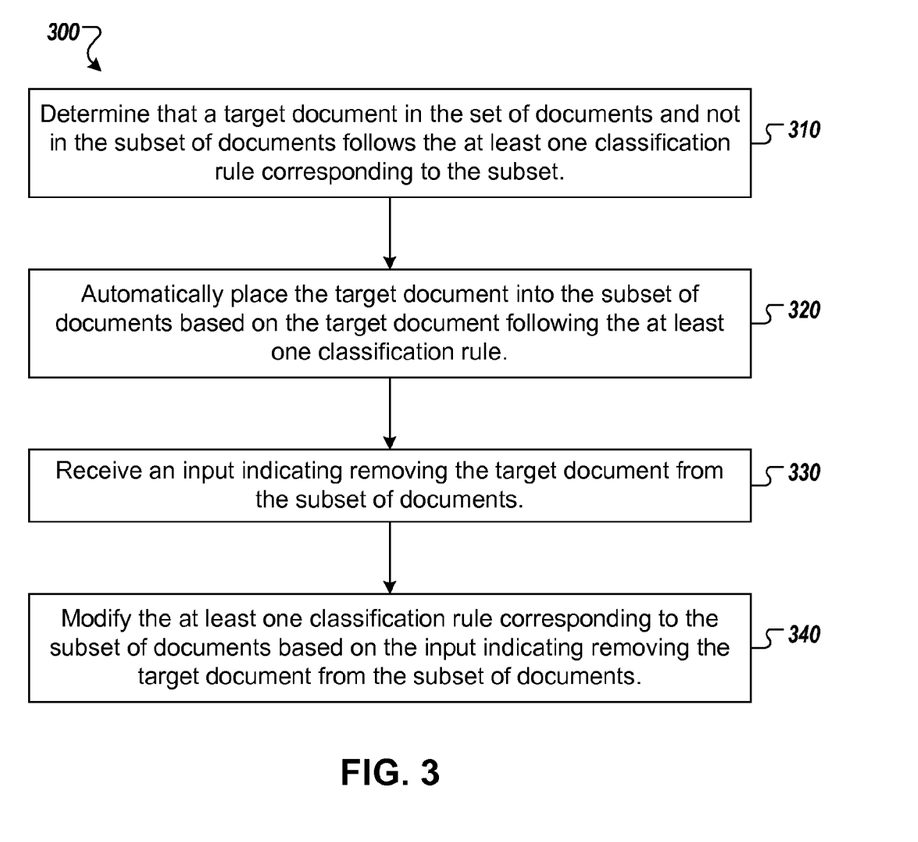
FIG. 3 illustrates an example process by which a classification rule corresponding to a subset of documents may be modified based on a document being removed from the subset of documents.

FIG. 3 illustrates an example process 300 by which a classification rule corresponding to a subset of documents may be modified based on a document being removed from the subset of documents.

The process 300 begins at step 310, where the computer determines that a target document in the set of documents and not in the subset of documents follows the at least one classification rule corresponding to the subset. If the set of documents includes electronic messages in an electronic messaging account, the target document may be an electronic message that was recently added to the electronic messaging account, e.g., an electronic message sent from or received in the electronic messaging account. If the set of documents includes files in a directory, the target document may be a file that was added to the directory.

In step 320, the computer automatically places the target document into the subset of documents based on the target document following the at least one classification rule. The computer may take an action associated with the subset of documents on the target document. For example, the computer may apply a label to the target document, cause the target document to be marked as read, cause the target document not to be placed in the inbox, or send an automatic reply message to the target document.

In step 330, the computer receives an input indicating removing the target document from the subset of documents. For example, the end-user may remove the target document from the subset of documents, e.g., by removing a label from the target document, by taking the target document out of a folder, or by taking the target document out of a subdirectory.

In step 340, the computer modifies the at least one classification rule corresponding to the subset of documents based on the input indicating removing the target document from the subset of documents. For example, an electronic messaging folder "tax-return-2010" may include six messages having the words "tax return" in the subject line and being from First-Accountant @Accounting.com. The computer may have created a corresponding classification rule for the "tax-return-2010" folder stating that, if a message is from First-Accountant@Accounting.com, the message is to be placed in the "tax-return-2010" folder. The computer may receive a seventh message from First-Accountant@Accounting.com with the subject "Dinner plans" and automatically place this message in the "tax-return-2010" folder. The end-user may remove the "Dinner plans" message from the "tax-return-2010" folder. In response, the computer may modify the corresponding classification rule for the "tax-return-2010" folder to indicate that, if a message includes the words "tax return" in the subject line and the message is from First-Accountant@Accounting.com, then the message is to be placed into the "tax-return-2010" folder. In one implementation, the end-user may be asked to approve or disapprove the modified corresponding classification rule, e.g., via a pop-up window that presents the modified classification rule and includes an "accept" button and a "reject" button. After step 340, the process 300 ends.

Figure 4:
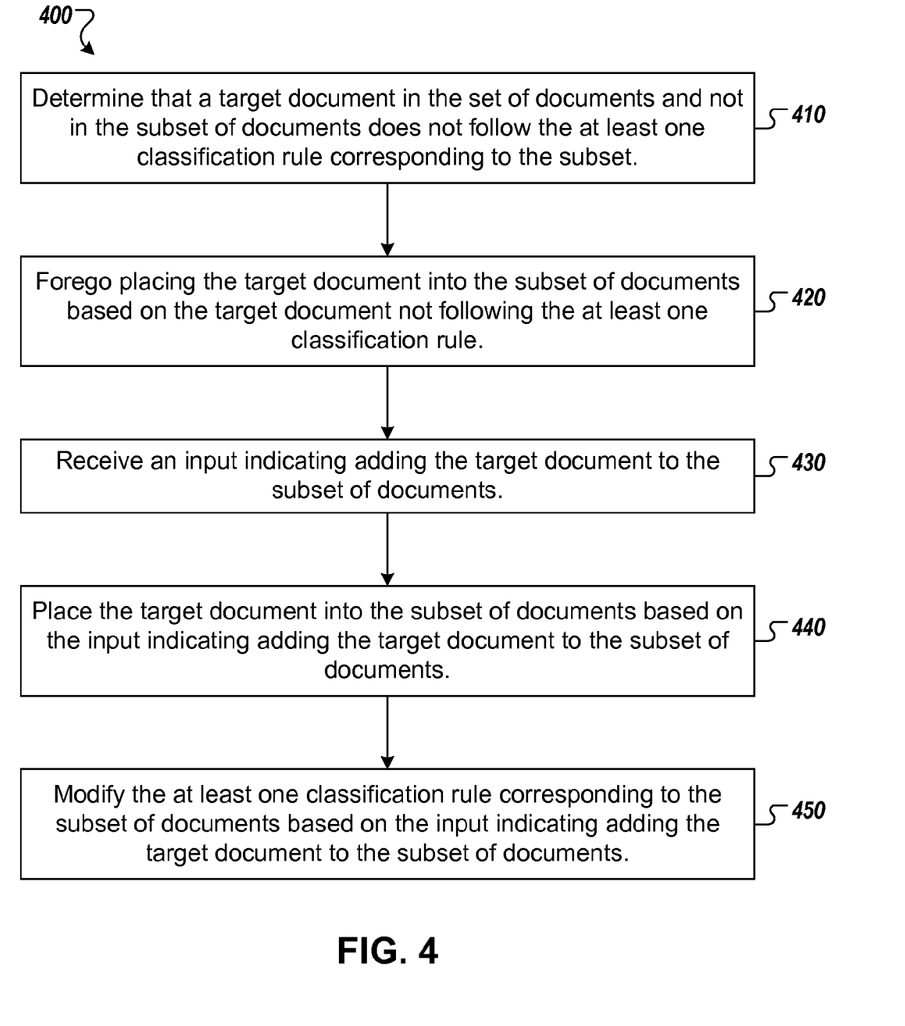
FIG. 4 illustrates an example process by which a classification rule corresponding to a subset of documents may be modified based on a document being added to the subset of documents.

FIG. 4 illustrates an example process 400 by which a classification rule corresponding to a subset of documents may be modified based on a document being added to the subset of documents.

The process 400 begins at step 410, where the computer determines that a target document in the set of documents and not in the subset of documents does not follow the at least one classification rule. If the set of documents includes electronic messages in an electronic messaging account, the target document may be an electronic message that was recently added to the electronic messaging account, e.g., an electronic message sent from or received in the electronic messaging account. If the set of documents includes files in a directory, the target document may be a file that was added to the directory.

In step 420, the computer foregoes placing the target document into the subset of documents based on the target document not following the at least one classification rule.

In step 430, the computer receives an input indicating adding the target document to the subset of documents. For example, the end-user may add the target document to the subset of documents, e.g., by adding a label to the target document, by placing the target document into a folder, or by placing the target document into a subdirectory.

In step 440, the computer places the target document into the subset of documents based on the input indicating adding the target document to the subset of documents. For example, the computer may place the target document into the subset of documents in response to the input.

In step 450, the computer modifies the at least one classification rule corresponding to the subset of documents based on the input indicating adding the target document to the subset of documents. For example, a directory "/Jane" may include a plurality of files and a subdirectory "/Jane/photos" may include files having a file type "JPG," and be associated with a corresponding classification rule that, if a file has a "JPG" file type, the file is to be added to the "/Jane/photos" subdirectory. A file "robot.GIF" may be added to the "/Jane/ directory. The computer might initially forego placing "robot.GIF" into the "/Jane/photos" subdirectory because "robot.GIF" does not have a "JPG" file type. However, an end-user might manually place the "robot.GIF" file into the "/Jane/photos" subdirectory. In response, the computer might automatically modify the corresponding classification rule to state that, if a file has a "JPG" or "GIF" file type, the file is to be added to the "/Jane/photos" subdirectory. In one implementation, the end-user may be asked to approve or disapprove the modified corresponding classification rule, e.g., via a pop-up window that presents the modified classification rule and includes an "accept" button and a "reject" button. After step 450, the process 400 ends.

Figure 5:
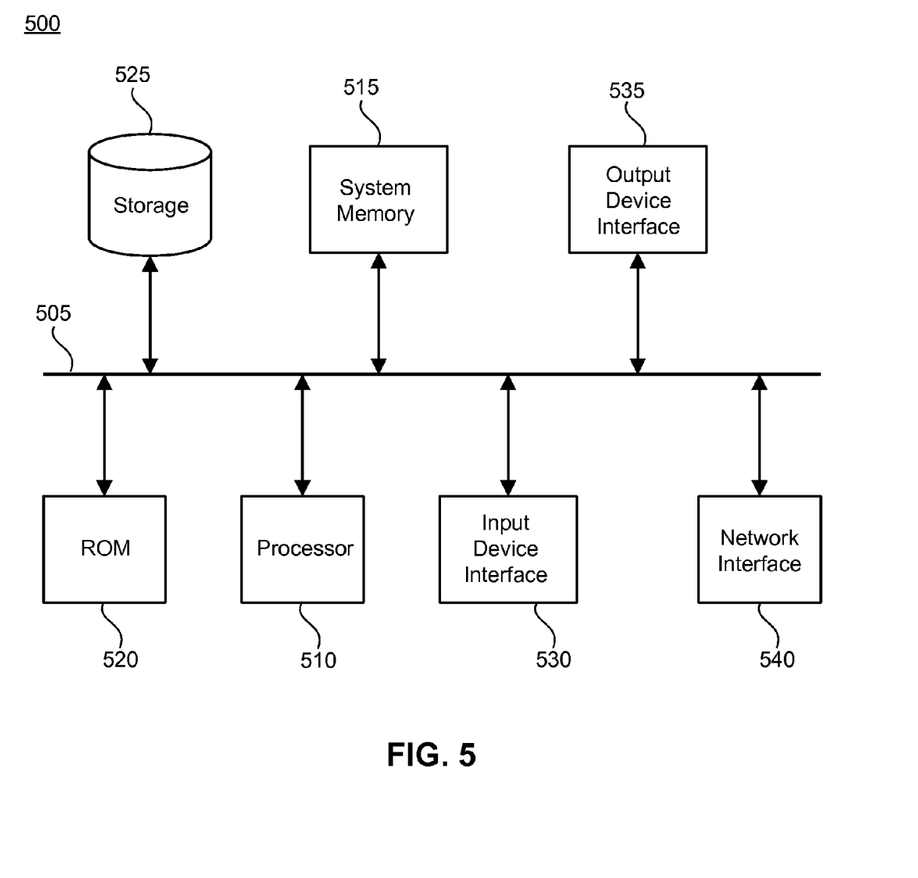
FIG. 5 conceptually illustrates an electronic system with which some implementations of the subject technology are implemented.

FIG. 5 conceptually illustrates an electronic system 500 with which some implementations of the subject technology are implemented. For example, the computer system 100 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for classifying documents based on automatically detected rules in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for classifying a set of documents, the method comprising:

receiving an identified subset of documents within a set of documents;

automatically creating at least one classification rule for the subset of documents based on the documents in the identified subset, wherein at least a true-positive threshold proportion of documents in the subset of documents follows the at least one classification rule, further wherein at most a false-positive threshold proportion of documents in the set of documents and outside the identified subset of documents follow the at least one classification rule;

storing the at least one classification rule in association with the identified subset of documents;

receiving an input indicating removing a target document from the identified subset of documents; and modifying the at least one classification rule based on the input indicating removing the target document from the identified subset of documents.

2. The method of claim 1, further comprising:

determining that the target document in the set of documents and outside the identified subset of documents follows the at least one classification rule; and automatically placing the target document into the identified subset of documents based on the target document following the at least one classification rule.

3. The method of claim 1, further comprising:

determining that the target document in the set of documents and outside the identified subset of documents does not follow the at least one classification rule; and foregoing placing the target document into the identified subset of documents based on the target document not following the at least one classification rule.

4. The method of claim 3, further comprising:

receiving an input indicating adding the target document to the identified subset of documents;

placing the target document into the identified subset of documents based on the input indicating adding the target document to the identified subset of documents; and modifying the at least one classification rule based on the input indicating adding the tartlet document to the identified subset of documents.

5. The method of claim 1, wherein the at least one classification rule comprises at least one Boolean expression.

6. The method of claim 1, wherein the set of documents comprises electronic messages in an electronic messaging account and the identified subset of documents comprises electronic messages in the electronic messaging account that are associated with a category.

7. The method of claim 6, wherein the category comprises a folder, a label or a mark.

8. The method of claim 6, wherein the category is associated with an action applied to the electronic messages in the electronic messaging account that are associated with the category.

9. The method of claim 8, wherein the action comprises one or more of: marking the electronic messages as read, foregoing placing the electronic messages in the inbox, or sending an automatic reply message.

10. The method of claim 6, wherein the at least one classification rule comprises one or more of a sender of the document being a member of a set of senders, a recipient of the document being a member of a set of recipients, a keyword being present in a subject of the document, or a keyword being present within the document.

11. The method of claim 1, wherein the set of documents comprises files in a directory and the identified subset of documents comprises the files in a subdirectory of the directory.

12. The method of claim 11, wherein the at least one classification rule comprises one or more of the document having one of one or more file types, a keyword being present in the filename of the document, or a keyword being present within the document.

13. A non-transitory computer-readable medium for classifying a set of documents, the computer-readable medium comprising instructions that, when executed by a computer, cause the computer to:
receive a plurality of identified subsets of documents within a set of documents;
automatically create at least one classification rule corresponding to each identified subset in at least a portion of the plurality of identified subsets of documents, the at least one classification rule being based on the documents in the corresponding identified subset, wherein at least one document in each identified subset in the at least a portion of the plurality of identified subsets follows the at least one corresponding classification rule;
store the at least one corresponding classification rule in association with each identified subset of documents in the at least the portion of the plurality of identified subsets of documents;
receive an input indicating removing a target document from the identified subset of documents; and
modify the at least one classification rule based on the input indicating removing the target document from the identified subset of documents.

14. The computer-readable medium of claim 13, wherein at least a true-positive threshold proportion of the documents in a first identified subset of documents in the at least a portion of the plurality of identified subsets of documents follow the at one corresponding classification rule.

15. The computer-readable medium of claim 13, wherein at most a false-positive threshold proportion of the documents in the set of documents and outside a first identified subset of documents in the at least a portion of the plurality of identified subsets of documents follow the at one corresponding classification rule.

16. The computer-readable medium of claim 13, wherein the plurality of identified subsets are mutually exclusive.

17. The computer-readable medium of claim 13, wherein the at least the portion of the plurality of identified subsets comprises four or more identified subsets.

18. The computer-readable medium of claim 13, wherein the instructions to automatically create at least one classification rule corresponding to each identified subset in at least a portion of the plurality of identified subsets of documents comprise instructions that, when executed by the computer, cause the computer to:
receive an input corresponding to an action taken by a user, the action comprising placing one or more documents into or outside of a first identified subset in the at least the portion of the plurality of identified subsets of documents; and
create, in response to the action taken by the user, at least one classification rule corresponding to the first identified subset.

19. The computer-readable medium of claim 18, wherein the action taken by the user comprises one or more of placing a document in a folder, adding a label to a document, or adding a mark to a document.

20. A system for classifying a set of electronic messages, the system comprising:
one or more processors; and
a memory comprising instructions that, when executed by the one or more processors, cause the one or more processors to:
receive an identified subset of electronic messages within a set of electronic messages;
automatically create at least one classification rule for the subset of electronic messages based on the electronic messages in the identified subset, wherein at least a true-positive threshold proportion of electronic messages in the identified subset of electronic messages follows the at least one classification rule, further wherein at most a false-positive threshold proportion of electronic messages in the set of electronic messages and outside the identified subset of electronic messages follow the at least one classification rule;
storing the at least one classification rule in association with the identified subset of electronic messages;
receive an input indicating removing a target document from the identified subset of documents; and
modify the at least one classification rule based on the input indicating removing the target document from the identified subset of documents.

21. The system of claim 20, wherein the memory further comprises instructions that, when executed by the one or more processors, cause the one or more processors to:
take an additional action associated with the electronic messages in the identified subset of electronic messages.

22. The system of claim 21, wherein the additional action comprises one or more of: placing the electronic messages in the subset into a folder, marking the electronic messages in the identified subset as important, flagging the electronic messages in the identified subset, foregoing placing the electronic messages in the identified subset in the inbox, marking the electronic messages in the identified subset as read, or sending an automatic reply message to the electronic messages in the identified subset.

* * * * *